(12) United States Patent
Simes

(10) Patent No.: US 6,429,576 B1
(45) Date of Patent: Aug. 6, 2002

(54) CENTRIFUGAL IMPULSE PIEZOELECTRIC ELECTRICAL GENERATOR

(76) Inventor: Arthell Simes, 1672 11th St., Oakland, CA (US) 94607

( * ) Notice: Subject to any disclaimer, the term of this patent is extended or adjusted under 35 U.S.C. 154(b) by 0 days.

(21) Appl. No.: 09/884,677

(22) Filed: Jun. 19, 2001

(51) Int. Cl.[7] ............................................... H01L 41/08
(52) U.S. Cl. ...................................... 310/339; 310/329
(58) Field of Search ........................ 310/328, 330–332, 310/329, 338, 339

(56) References Cited

U.S. PATENT DOCUMENTS

| | | | | |
|---|---|---|---|---|
| 3,101,420 A | * | 8/1963 | Hufferd et al. | 310/328 X |
| 3,208,443 A | * | 9/1965 | Hurwitz | 310/328 X |
| 3,350,583 A | * | 10/1967 | Schiavone | 310/328 |
| 3,463,942 A | * | 8/1969 | Mellon | 310/329 |
| 3,539,841 A | * | 11/1970 | Riff | 310/339 |

* cited by examiner

Primary Examiner—Mark O. Budd

(57) ABSTRACT

A piezoelectric generator comprises a centrifugal force sampling mechanism being carried around a central axis. The direction of the centrifugal forces, do to rotational control, acting on the sampling mechanism is reversed periodically to alternately apply and relieve distortion on two adjacent piezoelectric elements. The slug shaped piezoelectric elements produce high voltage charges while undergoing little change in shape or length in response to high-energy impulses.

2 Claims, 5 Drawing Sheets

CENTRIFUGAL IMPULSE PIEZOELECTRIC ELECTRICAL GENERATOR

BACKGROUND OF THE INVENTION

This invention relates to the generation of electrical energy, and particularly to a piezoelectric electric generator using a centrifugal impulse to mechanically distort the piezoelectric elements.

Mechanical distortions of piezoelectric materials cause displacements of electrical charges within the materials. The forces needed to cause this distortion must be alternately applied and relieved for generation of electrical energy. The energy required to alternately apply and relieve the mechanical distortions on the piezoelectric materials is generally grater than the electrical energy output of the generator. The present invention addresses this problem.

SUMMARY OF THE INVENTION

In accordance with the first aspect of the invention, a group of elements (hereinafter referred to as the impulse assembly) comprising two preloaded piezoelectric elements mounted centric to a pair of weighted lever arms are rotated around a central axis. The lever arms are mounted at opposite ends of the impulse assembly with the weighted end of each lever arm directed outward along the same vertical plane. The piezoelectric elements are preloaded at equal and opposite position from the pivot point of each lever arm, locking the lever arms in position. This arrangement allows unloading of one piezoelectric element and simultaneous loading of the adjacent piezoelectric element. This invention has the advantage of delivering high impact, high frequency impulses to the piezoelectric elements, independent of the energy needed to drive the drive shaft.

Each piezoelectric element is a cylindrical slug clamped between two opposing lever arms. As the torque forces are applied to each end of the slug, the piezoelectric element is distorted and shortens 3 to 4 micro inches per 100 psi. This small movement in the position of the lever arms has a negligible effect on the balance and inertia of the generator.

In accordance with the final aspect of the invention, one or more impulse assemblies may be used to form a single generator output. The impulse assemblies being matched must be placed around the central axis to form a precision balanced flywheel assembly. Once the generator is at maximum operating speed. The primary energy needed to drive the drive shaft, will be the generators own inertia. Overloading the generator output does not create feedback or loading of the drive shaft. Only a small amount of input energy is needed to overcome the inherent resistance of the generator. Accordingly, the primary advantage of the invention is its ability to generate enough energy to operate itself and other electrical devices simultaneously and indefinitely. Further objects and advantages of particular aspects of my invention will become apparent from a consideration of the drawings and ensuing description thereof.

DESCRIPTION OF THE DRAWINGS

Some of the drawing figures are not necessarily to scale.

DESCRIPTION OF THE INVENTION

Figure 1:
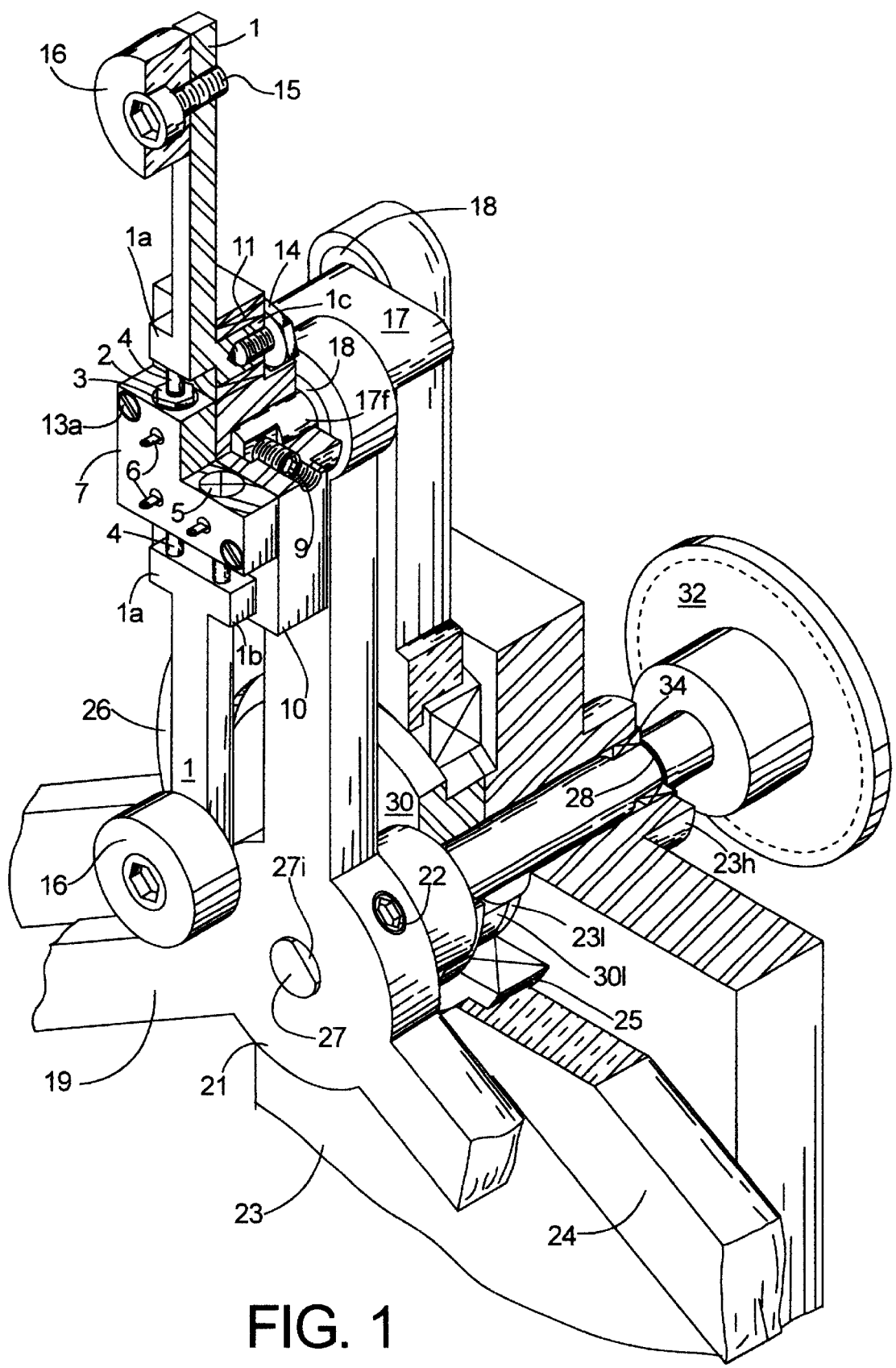
FIG. 1 is an isometric view of the centrifugal impulse piezoelectric generator in accordance with this invention, with duplicated structures broken away and some structures partly in section.

Refer to FIG. 1 as an overview of the following descriptions.

Figure 6:
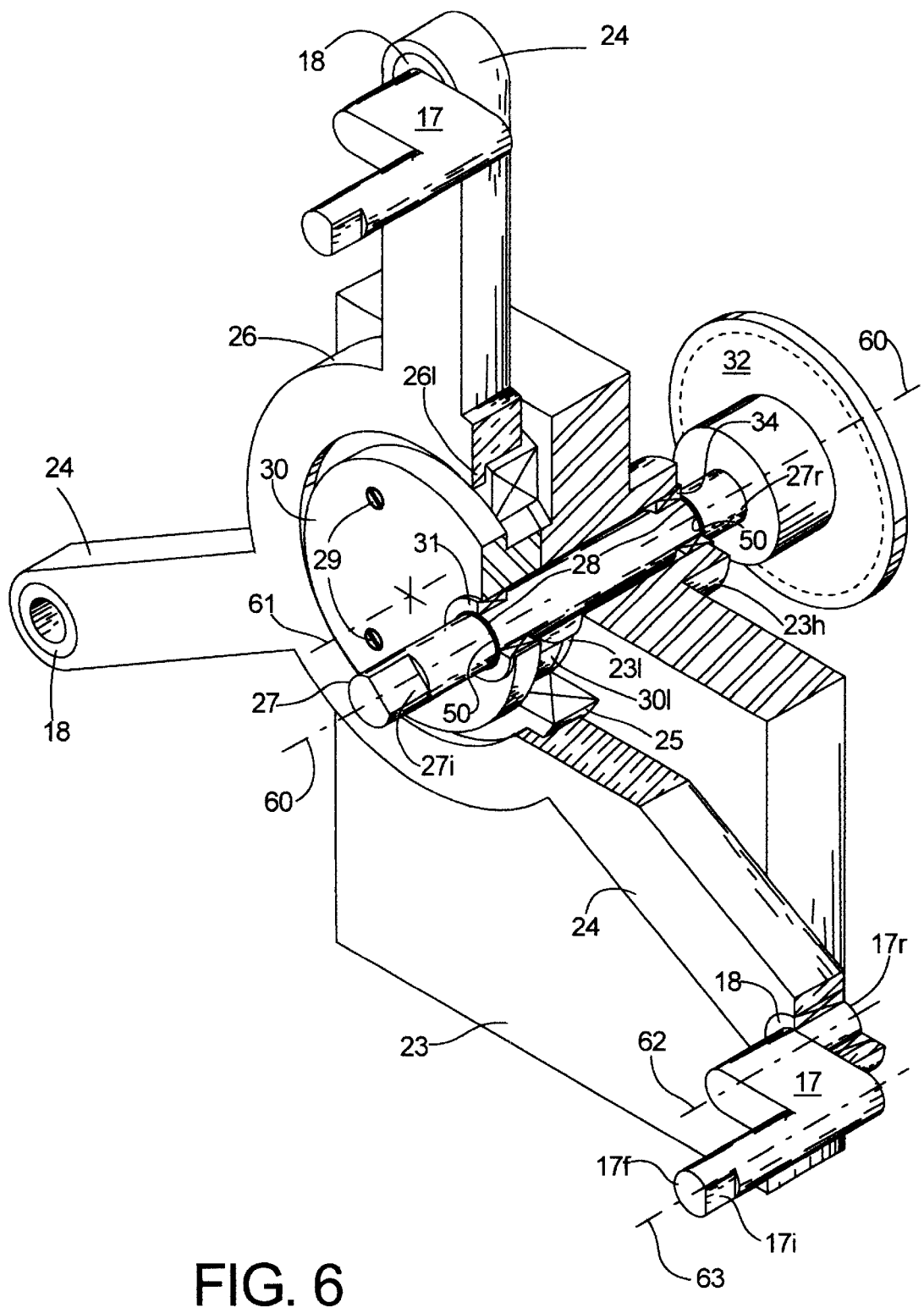
FIG. 6 is an isometric view of the offset wheel with two offset shafts inserted and one bearing position partly in section, mounted on the generator mount. The view includes the generator mount partly in section with the drive shaft and the drive wheel in position.

With reference to FIG. 6, all elements are supported by the generator mount 23, which has a hub 23h at the rear to support the rear drive shaft bearing 34. The two drive shaft bearings 34 and 31 define a shaft central axis 60. The front of the generator mount 23 has a circular lip 231 with a diameter equal to the inside diameter of the offset wheel bearing 25 and a rise equal to 20% the thickness of bearing 25. The axis 61 of the circular lip 231 is sufficiently offset along a horizontal plane from the central axis 60 to allow the drive shaft 27 to rotate around the central axis 60 without making contact with the inside diameter of the offset wheel bearing 25. This offset will hereinafter be referred to as the "alignment offset".

The offset wheel bearing 25 is fitted onto the circular lip 231 and held in place by the bearing cap 30.

The top section of bearing cap 30 has a diameter slightly greater than the inside diameter of the offset wheel bearing 25 and the bottom section 301 has a diameter equal to that of the circular lip 231. In addition, a drive shaft bearing 31 is mounted at a position centered on the central axis 60. Two screws 29 are used to hold the bearing cap 30 and the drive shaft bearing 31 in position.

The drive shaft 27 extends through and axially beyond drive shaft bearings 34 and 31. The front end of the drive shaft 27 has an indentation 27i. A drive wheel 32 is machine pressed onto the rear end 27r of the drive shaft 27. Two retaining rings 28 restrain linear motion along the central axis 60 by drive shaft 27. The retaining rings 28 are inserted into groves 50 on the drive shaft 27 located adjacent to the front of drive shaft bearing 31 and at the rear of drive shaft bearing 34.

The offset wheel 26 is fitted onto the outer race of the offset wheel bearing 25. The offset wheel 26 comprises an inner lip 261 and three spokes 24 equally spaced and projecting outward. A bearing 18 is machine pressed into the outermost end of each spoke 24, and each bearing 18 is at an equal distance (hereinafter referred to as the impulse radius) from the offset axis 61.

The offset shaft assembly 17 comprises a front shaft 17f and a rear shaft 17r. The axes 63 of the front shaft 17f and the axis 62 of the rear shaft 17r are offset along a horizontal plane a distance equal to the "alignment offset". The offset shaft assembly 17 does not rotate around either axis 62 or 63. The forward end of shaft 17f has an indentation 17i used to secure impulse means. Two of the three offset shaft assemblies 17 required in this invention are shown with their rear shafts 17r inserted fully into two bearings 18.

Figure 5:
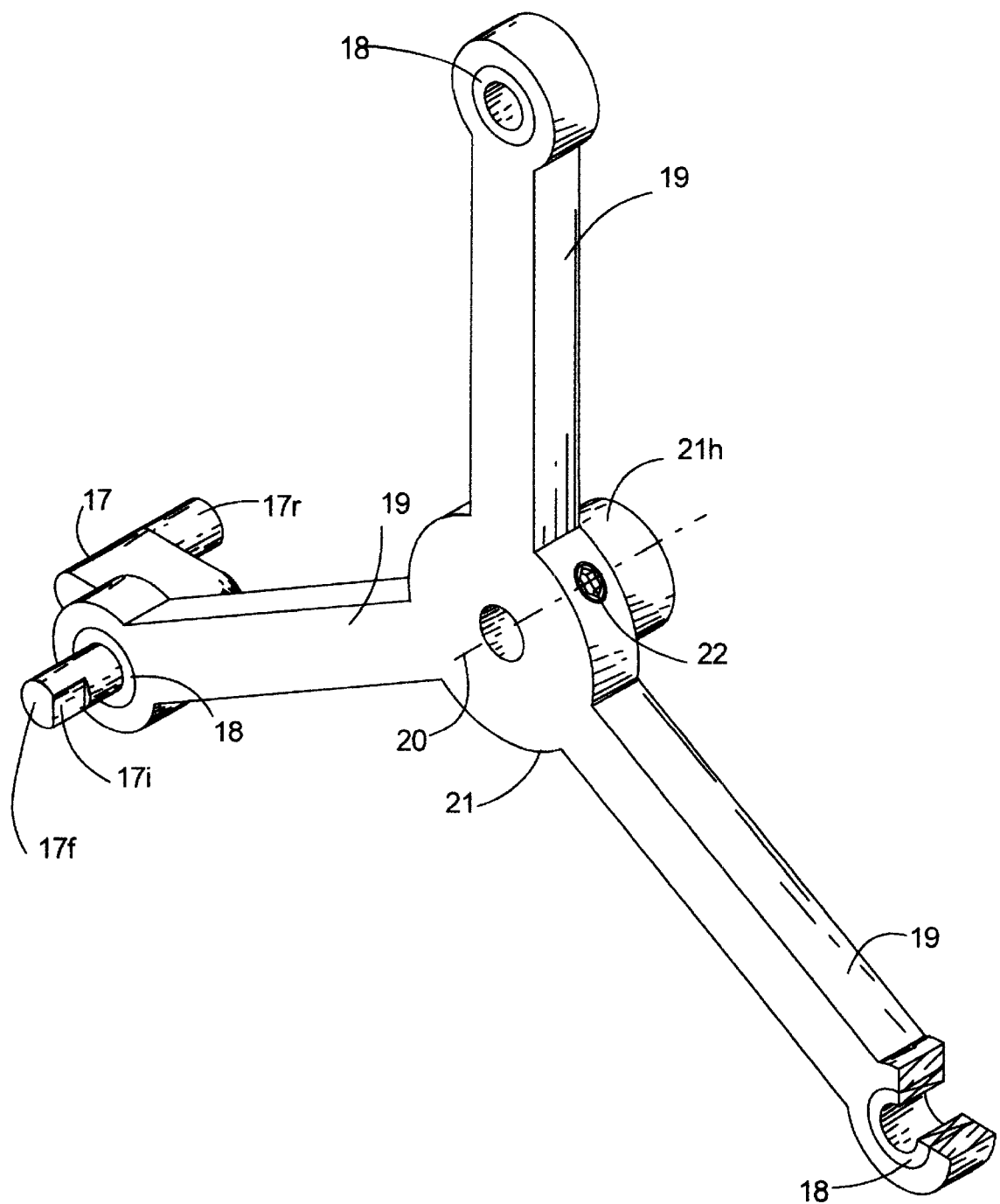
FIG. 5 is an isometric view of the central wheel with an offset shaft inserted in one bearing position and another bearing position partly in section.

With reference to FIG. 5, the central wheel 21 comprises a hub extension 21h; a setscrew 22 and three spokes 19. The hub extension 21h increases the mounting stability of the central wheel 21. The three spokes 19 are equally spaced and projecting outward. A bearing 18 is machine pressed into the outermost end of each spoke 19. The distance from each bearing 18 to the central wheel's axis 20 is equal to the "impulse radius". One of three offset shaft assemblies 17 required in this invention is shown with its front shaft 17f extended through and axially beyond a bearing 18.

With reference to FIGS. 5 and 6, the drive shaft 27 extends axially through the central wheel 21 and its hub extension 21h to align the indentation 27i with the setscrew 22. With the rear shaft 17r and the front shaft 17f of each offset shaft assembly 17 positioned as previously defined, the setscrew 22 is tightened against the indentation 27i to secure the position of the central wheel 21.

Figure 2:
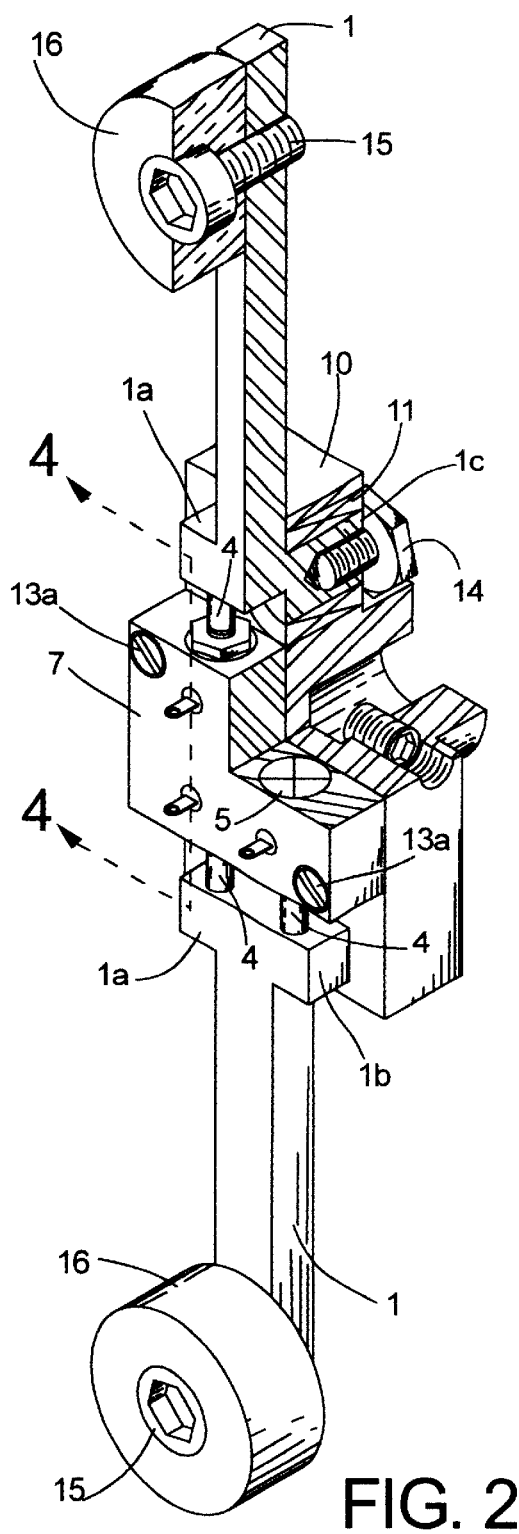
FIG. 2 is an isometric view of the impulse assembly with top half of view partly in section.
Figure 3:
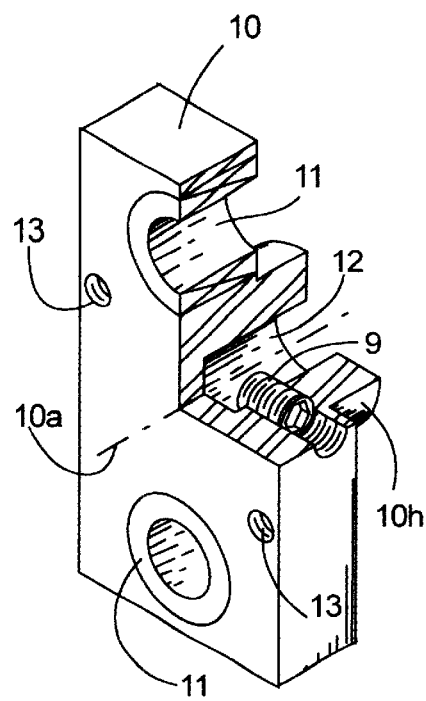
FIG. 3 is an isometric view of the impulse assembly's base shown in isolation and partly in section.

With reference to FIG. 3, the base 10 of each impulse assembly comprises a hub 10h, a setscrew 9 and two bearings 11 at opposite ends of the base 10. The two bearings 11 and the base axis 10a are in the same vertical plane with each bearing 11 equally spaced from the base axis 10a. The inside diameter 12 of the hub 10h extends along axis 10a and a short distance pass the setscrew 9. The two threaded holds 13 are used to secure the piezoelectric housing 7 as shown in FIG. 2.

With reference to FIG. 3 and 5, the front shaft 17f is inserted fully into the base 10 along axis 10a to align the indentation 17i with the setscrew 9. The setscrew 9 is tightened against the indentation 17i to secure the position of the impulse assembly base 10.

With reference to FIG. 2, a complete impulse assembly is shown with its piezoelectric housing 7 mounted to a base 10 using two screws 13a. A short shaft 1c (hereinafter referred to as a pivot point) extends end to end through bearings 11. Each lever arm 1 has two short lever arm extensions 1a and 1b at right angles to the lever arm 1 and positioned at its pivot point 1c. A hex head screw 15 is used to mount a weight 16 to the end opposite the pivot point 1c of each lever arm 1. Each pivot point 1c is secured with a flat head bolt 14 opposite the lever arm 1. The weighted end of each lever arm 1 is directed away from the piezoelectric housing 7, with each lever arm extension 1a and 1b making contact with an individual preload screw 4. The housing 7 contains a pair of piezoelectric elements 5 with preloading means at either end of each. Equal preloading of the piezoelectric elements 5, places equal pressure on the lever arm extensions 1a and 1b, locking each lever arm 1 into position.

Figure 4:
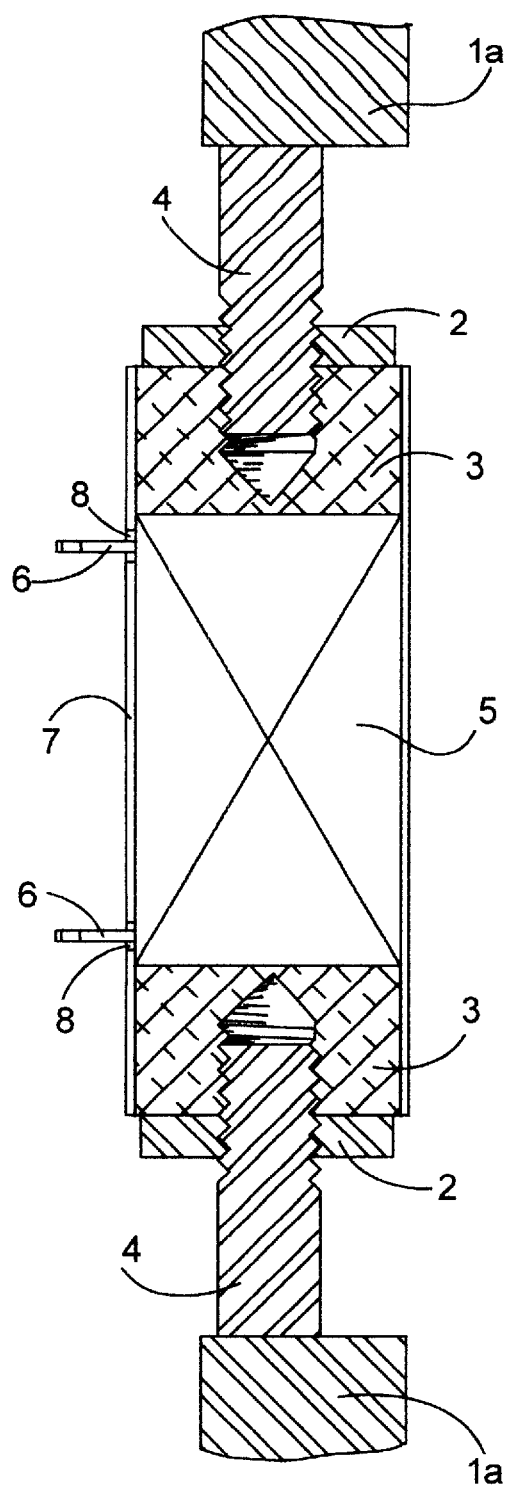
FIG. 4 is a sectional view of the piezoelectric element, it's housing and the elements related to the loading and preloading of the piezoelectric element as shown in FIG. 2 taken along line 4—4 of FIG. 2.

With reference to FIG. 4, each piezoelectric element 5 has preloading means at each end comprising a piston 3 in full contact with the piezoelectric element 5 and extending to the end of the housing 7, a preload screw 4 and a locking nut 2. Preloading causes the piezoelectric element 5 to distort and shorten. The preload screw 4 is adjusted to remain in contact with the lever arm extension 1a (or 1b as shown in FIG. 2) when unloading of the piezoelectric element 5 occurs. The locking nut 2 retains the position of the preload screw 4. Each piezoelectric element 5 has an electrode 6 at each end extending through a hold 8 in the housing 7 from which electrical energy can be obtained.

OPERATION OF THE INVENTION

With reference to FIG. 1, the drive wheel 32 is used to transfer energy to the drive shaft 27. The type of drive wheel 32 is determined by the coupling means required (i.e., gear, chain, drive belt . . . etc.), to connect the drive wheel 32 to the input energy source. The central wheel 21 is driven directly by the drive shaft 27.

The central wheel 21, by means of the offset shaft assemblies 17, drives the offset wheel 26 around the offset axis 61 (as shown in FIG. 6). The offset wheel 26 rotates freely on bearing 25. This arrangement restrains the offset shaft assemblies 17 from rotating around their own axes and establishes rotational control of the impulse assemblies. Accordingly the vertical orientation of the impulse assemblies remain fixed as they rotate around the drive shaft 27.

Electrical energy is generated when the two lever arms 1, mounted at opposite ends of the impulse assembly base 10, develop equal and opposite torque rotation at the pivot points 1c. The opposing torque rotations serve two important functions. First, the opposing forces are directed onto opposite ends of a piezoelectric element 5 through a piston 3, a preload screw 4 and a lever arm extension 1a or 1b. The applied forces cause the piezoelectric element 5 to distort and shorten, creating an electric charge across its electrodes 6. Secondly, the equal but opposite rotational energies exerted on the impulse base 10 cancel out, greatly reducing or eliminating any torque loading of the coupling, (offset shaft assembly 17) between the central wheel 21 and the offset wheel 26.

The position of the piezoelectric elements 5 and their preloading elements is maintained by the housing 7. The mass of the weight 16, the length of the lever arm 1, the impulse radius and the rotational rate of the drive wheel 32 determine the amount of force applied to the piezoelectric elements 5.

The centrifugal forces acting on the weight 16 are constant, however the angle at which the forces are applied to the weight 16 with respect to the lever arm 1 result in a periodic sampling of the forces, generating a centrifugal impulse. For each 360-degree rotation wherein the axis of the impulse assembly and the axis of the drive shaft 27 intersect the same vertical plane at 0 and 180 degrees, the centrifugal forces will be parallel to the lever arms 1, generating negligible torque at the pivot points 1c. When the axis of the impulse assembly and the axis of the drive shaft 27 intersect the same horizontal plane at 90 and 270 degrees, the centrifugal forces will be at right angles to the lever arms 1, generating torque at the pivot points 1c. At 0 and 180 degrees the forces acting on the piezoelectric elements 5 are equal and supplied by the preloading elements only. At 90 degrees peak forces are applied to one piezoelectric element 5 and negligible forces on the adjacent piezoelectric element 5. At 270 degrees the application of forces to the piezoelectric elements 5 are reversed. Accordingly each piezoelectric element 5 receives one complete impulse per 360 degrees of rotation at 180 degrees out of phase with its adjacent element.

While the above description contains many specificities, these should not be construed as limitations on the scope of the invention, but rather as an exemplification of one preferred embodiment thereof. Many other variations are possible, for example; the piezoelectric elements can be mounted directly adjacent to the mass on which the centrifugal forces are applied. It is also possible to construct an impulse assembly with a flexible weighted piezoelectric element. The shaft on which the impulse assembly is mounted can be restrained from rotating around its own axis by fitting it with a gear and coupling it to a gear of equal size mounted and fixed at the central axis. Gearing of unequal size can be used to change to rotation of the impulse assembly around its own axis and thus change the centrifugal sampling rate. The energy from the impulse assemblies can be mechanically transmitted to stationary piezoelectric elements. Accordingly, the scope of the invention should be determined not by the embodiment illustrated, but by the appended claims and their legal equivalents.

What is claimed is:

1. An autonomous, high efficiency, centrifugal impulse piezoelectric electrical generator comprising a plurality of impulse assemblies each mounted on the front shaft of a rotational control means with the axes of the rear shaft of said rotational control means being offset from the axes of said front shaft; said front shaft mounted through bearings mounted symmetrically on spokes of a central wheel; said rear shaft mounted on bearings mounted symmetrically on spokes of a offset wheel; said rotational control means coupling said central wheel to said offset wheel; axes of said central wheel mounted on the front end of the drive shaft; said drive shaft mounted through bearings at front and rear of the generator mount with a drive wheel mounted on the rear end of said drive shaft; said offset wheel mounted on an offset wheel bearing mounted on the front of said generator mount with the axes of said offset wheel bearing vertically offset from the axes of said drive shaft a distance equal to the offset between said front shaft and said rear shaft of said rotational control means; said impulse assemblies are held in vertical alignment as they rotate around said drive shaft generating an alternating centrifugal force on said impulse assemblies.

2. A generator according to claim 1 wherein said impulse assemblies comprise a pair of matching piezoelectric elements mounted parallel and centered on a base with opposite ends of said piezoelectric elements align to top and bottom of said base; preloading means mounted to all said opposite ends of said piezoelectric elements; two matching "T" shaped lever arm means, with pivot points extending perpendicular to intersect of said lever arm means; said pivot point mounted on bearings mounted and centered at said top and said bottom of said base; with the body of said "T" shaped lever arm means aligned opposite to said piezoelectric elements and opposite ends of the top of said "T" shaped lever arm means in contact with adjacent said preloading means; a matching mass is mounted on said body farthest from said intersect on each said "T" shaped lever arm means; said alternating centrifugal forces acting on said mass provide means for alternately compressing one said piezoelectric element while decompressing the adjacent said piezoelectric element; the resulting equal but opposite torque cancel out producing no load on said base and limiting drive resistance and load.

* * * * *